Aug. 30, 1932.　　　　　E. R. RYDER　　　　　1,875,160

LIQUID METER

Filed May 26, 1927

WITNESSES
Robt S. Bassett
W E Glass

INVENTOR
Earl R. Ryder.

Patented Aug. 30, 1932

1,875,160

UNITED STATES PATENT OFFICE

EARL R. RYDER, OF BUFFALO, NEW YORK, ASSIGNOR TO CHARLES K. BASSETT, OF BUFFALO, NEW YORK

LIQUID METER

Application filed May 26, 1927. Serial No. 194,461.

The general objects of the invention are to provide a liquid meter or measuring device adapted to operate without undue wear or binding in all positions, and with a maximum possible accuracy due to the elimination of a portion of the un-measured leakage customary in such devices.

In the accompanying drawing Figure 1 is a vertical section through the meter and through its measuring chamber. The inlet and outlet openings are not restricted to the exact form shown and either of them may be in either part of the outer casing.

Figure 1:
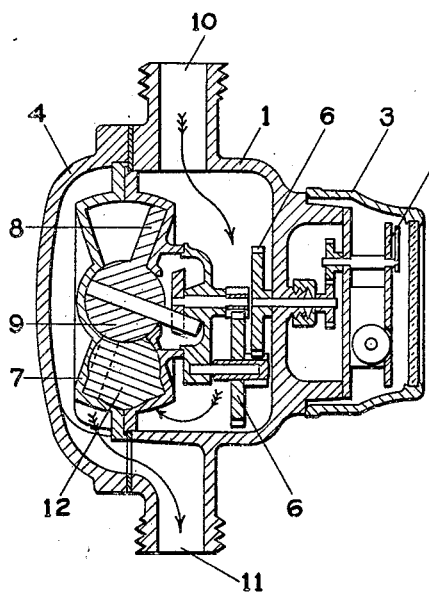
Figure 2:
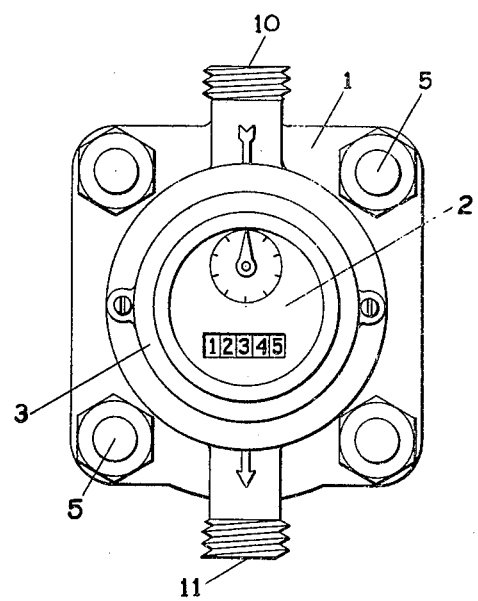
Figure 2 is a horizontal view of the meter from the dial face side showing the inlet and outlet openings of the meter in a vertical line. While the meter is shown in this position it may also be operated in any relative position and my application does not limit itself to the exact position in which the meter is to be operated.
Figure 3:
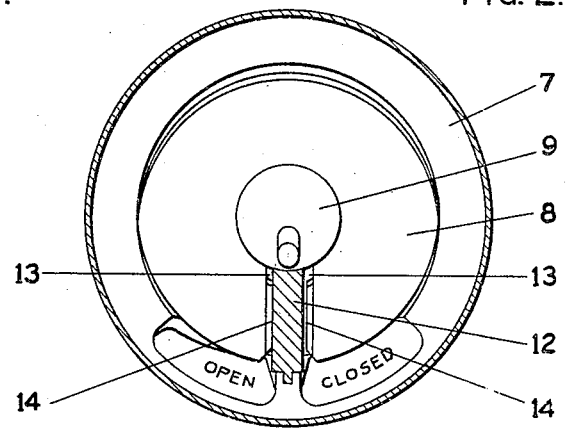
Figure 3 is a vertical section through the disc chamber at right angles to the axis of the chamber. The disc itself is not shown in section but is shown complete.
Figure 4:
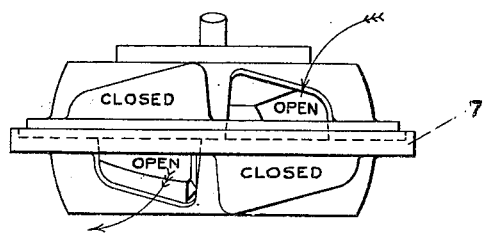
Figure 4 is an external view of the disc chamber showing the inlet and outlet ports and the general appearance of this part of the mechanism.

In these views 1 is the half of the outer main casing bearing indicating register 2 and register cap 3. 4 is the other portion of the outer main casing which is necessary to enclose the interior working parts. 5 are bolts or similar devices for holding together the outer main casing parts 1 and 4. 6 is the intermediate gearing connecting the meter register 2 with disc chamber 7. The motion of a radially slotted disc 8 driven by the liquid passing through the meter is transmitted to gearing 6 by means of the usual construction as shown. The nutating measuring disc 8 has a central ball portion 9 which rocks in the sockets of disc chamber 7 and is supported upon a partition 12 as hereinafter described in greater detail.

Inlet opening 10 and outlet opening 11 are both opposite each other and constitute parts of casing 1. They may, however, both or one be located in casing 4. The exact position of these openings is not limited, however, to the exact form shown.

Measuring chamber 7 has its interior surfaces generally concentric with its main axis which will be hereafter referred to as the measuring chamber axis. My invention provides for suitable construction so that a liquid meter may be operated without binding and without undue wear with the axis of the measuring chamber in a horizontal position instead of the customary vertical position.

This is accomplished by the construction of measuring chamber partition 12. As shown partition 12 is directly below disc ball 9 when the meter is installed with the measuring chamber axis in a horizontal position. In this manner partition 12 supports the weight of disc 8 because of the contact between partition 12 and disc ball 9. This area of contact is unusually large and furnishes an ample area of support for disc 8.

At the same time this unusually large area of contact between partition 12 and disc ball 9 stops to a large extent the leakage usually occurring across this joint in the customary construction with a very thin partition 12. Disc 8 has clearance spaces 13 and 13 on either side of partition 12. The contact between the radial faces of disc 8 and partition 12 is at points 14 and 14 where the edge of the slot in disc 8 is beveled suitably. The sides of partition 12 are preferably parallel to each other and the central plane of said partition is preferably radial from the central axis of the measuring chamber. The exact shape of the sides of partition 12 is not limited to the form shown but may be of any suitable form for providing a contact area on partition 12 at points 14 and 14 for engaging disc 8. An important point of my invention is providing clearance spaces 13 and 13 to prevent disc 8 from binding on partition 12 during its nutating motion. This construction is new and novel and at the same time a distinction of practical importance as compared with the unsuccessful previously existing constructions in that it provides for a partition of relatively large width and with its face in contact with the disc ball and engaging at its side faces the slotted portion of the disc except at a point immediately adjacent to the disc ball.

From tests which have been made, a meter having an arc and width of contact between 3½% and 4% of the maximum diameter of the disc is much better than meters now on the market where the arc of contact is considerably less. If, however, this arc and width of contact is increased to 4½% of the maximum diameter of the disc the meter works very much better. Similarly according to the liquids to be measured, this contact can be increased up to 25% of the maximum diameter of the disc, thereby, giving a greater area in contact so as to effect a more effective liquid seal at this point. To obtain the proper liquid seal, the width of this arc of contact (i. e. the width of partition 12) is approximately equal to but somewhat greater than the thickness of the disk 8.

Having described the invention I claim as new and desire to secure by Letters Patent:

A liquid meter comprising an annular nutating disk chamber having a fluid inlet and fluid outlet and being disposed with its axis horizontal, and having a central co-axial spherical socket; a vertical partition arranged in said chamber and comprising a spherical seat having a width between 3.5% and 25% of the diameter of said chamber; a nutating disk having a hub arranged within said spherical socket of said chamber and supported upon said spherical seat of said partition, and also having a radial slot on one of its sides which is arranged to receive said partition, said disk adjacent to said hub being cut away so as to be out of contact with said partition; and means connected with said disk for measuring the number of its nutations.

EARL R. RYDER.